(12) United States Patent
Zhang et al.

(10) Patent No.: US 9,584,043 B2
(45) Date of Patent: Feb. 28, 2017

(54) INVERTER PHASE CURRENT RECONSTRUCTION APPARATUS AND METHODS

(71) Applicant: Rockwell Automation Technologies, Inc., Mayfield Heights, OH (US)

(72) Inventors: Zhendong Zhang, Mequon, WI (US); Takayoshi Matsuo, Brown Deer, WI (US); David Leggate, New Berlin, WI (US); Timothy M. Rowan, Wauwatosa, WI (US); Russel J. Kerkman, Milwaukee, WI (US); Bing Li, Singapore (SG)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/634,737

(22) Filed: Feb. 28, 2015

(65) Prior Publication Data

US 2016/0254760 A1 Sep. 1, 2016

(51) Int. Cl.
*H02M 7/48* (2007.01)
*H02M 7/5387* (2007.01)
*H02M 1/00* (2006.01)

(52) U.S. Cl.
CPC ......... *H02M 7/48* (2013.01); *H02M 7/53871* (2013.01); *H02M 2001/0009* (2013.01)

(58) Field of Classification Search
CPC .... H02M 7/539; H02M 7/48; H02M 7/53873; H02P 29/024; H02P 27/08; H02P 21/24

USPC ....... 363/37, 41, 95, 97, 98, 56.04; 318/801, 318/800, 400.04, 400.17, 600, 601, 318/811–812, 803, 599
See application file for complete search history.

(56) References Cited

U.S. PATENT DOCUMENTS

| | | | | |
|---|---|---|---|---|
| 4,772,996 A | * | 9/1988 | Hanei | H02M 7/53873 318/811 |
| 5,663,627 A | * | 9/1997 | Ogawa | F24F 11/0009 318/803 |
| 5,912,813 A | * | 6/1999 | Kerkman | H02M 7/53875 318/811 |

(Continued)

FOREIGN PATENT DOCUMENTS

EP 1863160 A2 12/2007

OTHER PUBLICATIONS

Parasiliti et al., "A Novel Solution for Phase Current Sensing in PWM-VSI Based AC Drives"; 9th European Conf. of Power Electronics and Applications 2001, Graz, Austria, Aug. 27-29, 2001.

*Primary Examiner* — Rajnikant Patel
(74) *Attorney, Agent, or Firm* — Fay Sharpe LLP

(57) ABSTRACT

Methods and apparatus are presented for sampling low side inverter phase currents, in which current sampling is selectively delayed in a given PWM cycle by a non-zero sampling delay time value from a nominal sample time if the middle pulse width value is less than a non-zero first threshold to facilitate adequate signal settling for accurate current measurement, and if a middle total continuous on-time near the end of the given PWM cycle is less than a non-zero second threshold, the middle total continuous on-time is selectively extended by adding a non-zero adjustment offset time value to a middle pulse width value for a next PWM cycle.

20 Claims, 7 Drawing Sheets

(56) References Cited

U.S. PATENT DOCUMENTS

| | | | | |
|---|---|---|---|---|
| 6,301,137 B1 * | 10/2001 | Li | ................ | H02M 7/53873 |
| | | | | 318/801 |
| 6,529,393 B1 | 3/2003 | Yu | | |
| 6,984,953 B2 * | 1/2006 | Quirion | ............ | H02M 7/53875 |
| | | | | 318/400.3 |
| 7,339,394 B2 * | 3/2008 | De Larminat | .......... | H02P 7/282 |
| | | | | 324/545 |
| 7,626,838 B2 * | 12/2009 | Gunji | ............... | H02M 7/53873 |
| | | | | 363/56.04 |
| 8,934,274 B2 * | 1/2015 | Kawashima | .......... | H02M 7/539 |
| | | | | 363/98 |

* cited by examiner

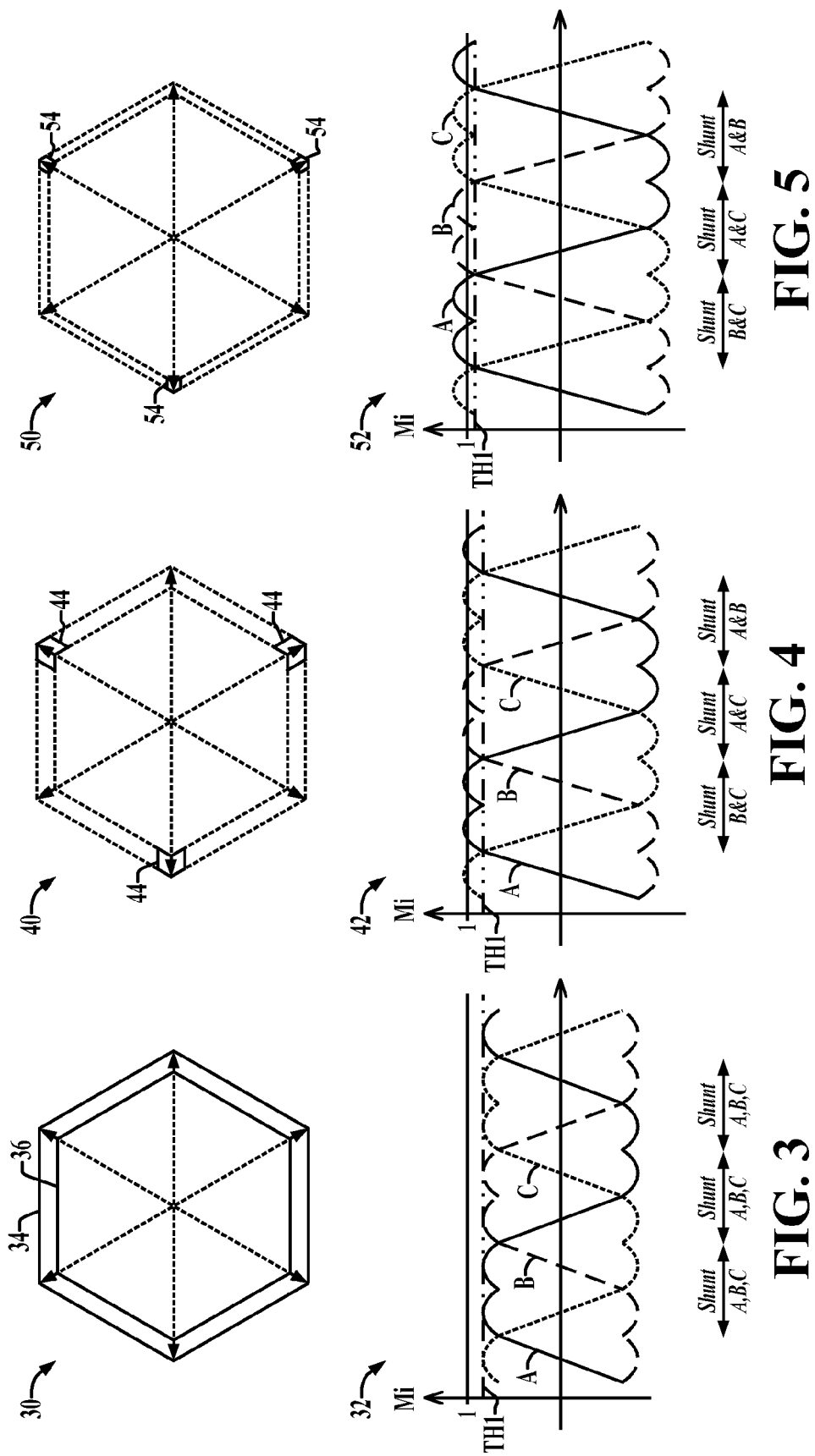

INVERTER PHASE CURRENT RECONSTRUCTION APPARATUS AND METHODS

BACKGROUND

The subject matter disclosed herein relates to power conversion, and more specifically to current sensing in motor drives and other power converters.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides sampling methods and apparatus in which low side inverter phase current sampling is selectively delayed in a given pulse width modulation (PWM) cycle from a nominal sample time if a middle pulse width value is less than a threshold. In further aspects, if a middle total continuous on-time near the end of the cycle is less than a threshold, the middle total continuous on-time is selectively extended for the next PWM cycle.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIGS. 3-5 illustrate space vector modulation diagrams and graphs.

DETAILED DESCRIPTION

Various embodiments are hereinafter illustrated and described, wherein the disclosure is not limited to the specific examples shown and described. Inverter phase current reconstruction techniques and apparatus are presented in which inverter low side shunt resistor voltages are sampled with selectively adjustable sample moments or sample times within a given PWM cycle to facilitate inverter operation over the entire voltage vector plane including unity modulation index operation and over-modulation conditions.

Figure 1:
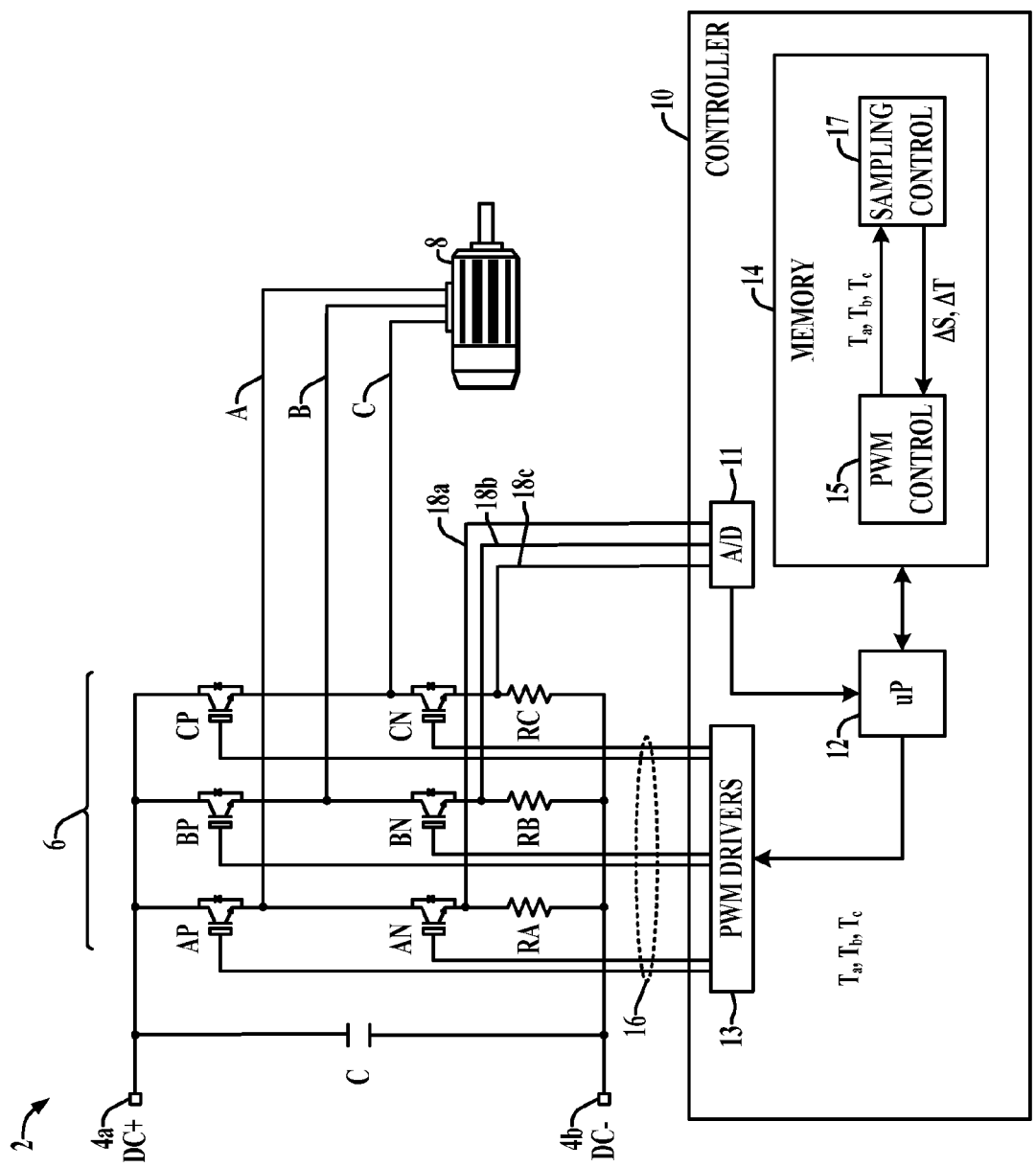
FIG. 1 is a schematic system diagram.

FIG. 1 illustrates a power conversion system 2, in this case a motor drive, with a switching inverter 6 converting DC power from first and second DC inputs 4a (DC+) and 4b (DC−) to drive a multiphase AC motor load 8. The system 2 in certain embodiments may receive DC input power from an external source (not shown) or an input rectifier (not shown) may be included to receive single or multiphase AC input power and provide DC output power to the inverter DC inputs 4a and 4b via a DC link circuit having a DC bus capacitance C as shown in FIG. 1 (voltage source converter or VSC). In other embodiments, one or more DC link chokes or inductances may be provided in a DC link circuit for a current source converter or CSC system 2. The switching inverter 6 receives the DC input power from the DC link circuit and includes IGBTs or other inverter switching devices AP, BP, CP, AN, BN and CN as well as low side resistive current shunts RA, RB ad RC forming three inverter leg circuits individually associated with a corresponding inverter AC output A, B, C. The individual inverter leg circuits include an upper or high side switching device (AP, BP or CP) coupled between the first DC input 4a and the corresponding AC output (A, B or C), as well as a lower or low side switching device AN, BN or CN coupled with the corresponding AC output and a current shunt RA, RB or RC coupled between the corresponding lower switching device AN, BN or CN and the second DC input 4b as shown in FIG. 1. Any suitable inverter switching devices may be used, non-limiting examples of which include insulated gate bipolar transistors (IGBTs) as shown, as well as silicon controlled rectifiers (SCRs), gate turn-off thyristors (GTOs), integrated gate commutated thyristors (IGCTs), etc.

The system 2 further includes a controller 10 providing inverter switching control signals 16 to the inverter switching devices AP, BP, CP, AN, BN and CN to convert DC power to provide multiphase, variable frequency, variable amplitude AC output power to drive the associated three phase motor load 8. The controller 10 also receives inverter output current feedback signals or values 18a, 18b, and 18c representing low side shunt resistor voltages corresponding to the inverter leg circuit phase currents of output phases A, B and C, respectively. In the embodiment of FIG. 1, the controller 10 includes an analog to digital (A/D) converter 11 providing digital values to a processor 12 representing the low side current feedback signals 18, and the processor 12 provides pulse width modulated control signals or information including low side inverter phase pulse width values $T_a$, $T_b$, $T_c$ representing one half of the low side continuous pulse preceding a carrier valley to a PWM driver circuit 13 for generating the switching control signals 16 to operate the inverter switches.

The controller 10 further includes a non-transient electronic memory 14 operatively coupled with the processor 12 and storing data and program instructions for execution by the processor 12. In particular, the memory 14 stores PWM control program instructions 15 for operating the inverter 6 by generating the switching control signals 16, as well as sampling control program instructions 17 for controlled sampling of the shunt resistor voltages (and hence the low side inverter leg circuit currents), where these program instructions may be considered processor-executable software or firmware modules executable by the processor 12 in certain embodiments. The controller 10 and the components thereof can include suitable logic or processor-based circuitry (e.g., processor 12) and an electronic memory (e.g., memory 14) storing data and programming code 15, 17, and may also include signal level amplification and/or driver circuitry such as comparators, carrier wave generators or digital logic/processor elements and signal drivers or combinations thereof (e.g., driver circuitry 13) to provide suitable drive voltage and/or current levels via the signals 16 sufficient to selectively actuate the inverter switching devices AP, BP, CP, AN, BN and CN.

The controller 10 in various embodiments can provide the switching control signals 16 according to any suitable pulse width modulation (PWM) technique, including without limitation carrier-based pulse width modulation, etc., which performs normal motor control tasks including pulse width modulation operation of the inverter switches. As further discussed below, moreover, selective sampling of the current feedback signals 18 is implemented by the analog-to-digital conversion circuitry 11 in synchronized fashion with respect to a triangular carrier wave 22 in the illustrated embodiments (e.g., FIG. 2), with the sampling control instructions 17 implemented by the processor 12 for selective shifting or delaying of current samples in a given PWM cycle to facilitate accurate inverter current sampling, particularly for high modulation index operation of the inverter 6. The current samples in certain embodiments are employed as feedback information in closed loop control of the inverter operation, although other embodiments are possible in which the current feedback signals 18 need not be used or considered in generation of the PWM switching control signals 16 used in operating the inverter 6 via processor execution of the PWM control component or program instructions 15.

As seen in FIG. 1, the inverter switches are individually connected between one of the DC bus terminals DC+ and DC− and the corresponding AC output phase A, B or C, and are operative according to the corresponding switching control signals 16 to selectively electrically connect or disconnect the corresponding DC terminal to/from the corresponding AC output line. In practice, the controller 10 provides inverter switching control signals 16 to the corresponding inverter switches in a manner suitable for conversion of the input DC electrical power to variable frequency, variable amplitude AC output power suitable for controlling operation of the connected motor load 8. In certain embodiments, for example, the inverter controller 10 provides the switching control signals 16 in order to implement a desired control strategy, for example, control or regulation of the motor operation according to one or more setpoint inputs (not shown), such as a desired motor speed, torque, position, etc., and the controller 10 may employ one or more feedback signals including the inverter current signals 18 to implement the control strategy in a closed loop fashion.

In one embodiment, moreover, the controller 10 implements closed loop control using a sine-triangle pulse width modulation technique in which a desired inverter output parameter (e.g., output voltage command signal or value) for each output phase A, B and C is compared with a corresponding triangle wave carrier 22 to determine the desired on or off state for the inverter switching devices associated with each phase. The modulation can be implemented in hardware using comparators, triangle waveform generators, etc. in other possible embodiments, the comparison of the carrier 22 and desired output value (e.g., voltage command vector) for a corresponding inverter output phase may be implemented in software/firmware executed by the processor 12, with the corresponding carrier waveform or waveforms 22 being stored in the electronic memory and/or otherwise implemented in processor-executed software and/or firmware.

Referring also to FIG. 1, the inventors have appreciated that cost effective and accurate inverter phase current detection for closed loop current control feedback is facilitated by controlling the sampling of the signals 18 by the A/D converter 11 under control of the processor 12. In particular, low side sensing using the shunt resistors RA, RB and RC can provide an accurate low-cost technique for sensing the inverter output currents while the corresponding low side switch AN, BN, CN is turned on, compared with higher cost solutions such as Hall sensors, etc. However, the use of low side shunt resistors requires that the current signal samples be taken while the corresponding low side switching device is turned on. In this regard, the on-time of the corresponding low side switch is controlled by the pulse width modulation control component 15, and thus the PWM control 15 and the sampling control 17 are implemented in synchronous fashion to facilitate measurement and sampling of the shunt signals 18 at or near valleys of the triangular carrier waveform 22.

The inventors have appreciated that operation at high modulation index results in narrowing of the on-time associated with one or more of the low side inverter switching devices AN, BN and CN. In addition, the narrowing of the low side device on-time may lead to inaccurate sampling based on the minimum required A/D converter sampling time and other factors, referred to herein as a minimum pulse width or $T_{MINPULSE}$. Accordingly, the controller 10 implements the sampling control instructions 17 in conjunction with the PWM control programming 15 in coordinated fashion to selectively shift the moment of sampling or sampling time TS (FIG. 2) within a given PWM cycle away from a nominal sampling moment, such as at or near the triangle carrier waveform valley (time TV in FIG. 2). This is particularly advantageous in situations such as high modulation index or over modulation conditions where the on-time of one or more of the low side switching devices following the carrier minimum or valley is determined to be too short to provide an accurate feedback signal or value representing the low side inverter current for the corresponding output phase. Although non-limiting embodiments are illustrated and described with respect to selective sample shifting away from a default or nominal location at the valley (TV), other embodiments are possible in which a default sampling time is not at the minimum or valley of the carrier waveform 22.

In addition, as needed, the controller 10 in certain embodiments further provides for selective extension or adjustment to extend specific low side device on-times (e.g., pulse width adjustment or extension) to facilitate accurate sampling for at least two of the shunt signals 18, in consideration of the sample time minimum requirements of a given system 2. Thus, the inventors have contemplated novel improved techniques to facilitate phase current detection throughout all or most of the voltage vector control plane using selective sample point delays alone or in combination with minimally intrusive interruption to the original PWM modulation pattern through selective pulse width adjustment or extension by the controller 10.

In this regard, the inventors have found that the minimum pulse width for a given system 2 can be determined according to one or more factors. Among these are a dead time $T_{dt}$ used in the provision of the PWM control signals 16 in order to mitigate or prevent shoot-through (e.g., short-circuit) conditions across the inverter DC inputs 4a, 4b. In certain implementations, the inventors have appreciated that the dead time $T_{dt}$ may or may not significantly affect the sampling depending on the current polarity, and the dead time $T_{dt}$ may be significantly shorter than other factors. Another factor is the current signal rise time $T_{rs}$ representing the time for low side inverter leg circuit current flowing through the sense resistor to stabilize after the lower leg switch turns on. In certain embodiments, $T_{rs}$ includes the propagation delay of the PWM signal and the rising and settling time of the current. In addition, the sampling circuitry for acquiring and converting the shunt sensors signals 18 in certain embodiments includes a total delay time $T_{sh}$ representing the time delay of the current feedback path, which includes signal conditioning time delay and may account for any included filter circuit delay and sampling time delay (e.g., including sample and hold circuit delays, etc.). For different applications and systems 2, the relative weighting of these time delays could be different. In practice in many systems, a primary cause of inaccurate current sampling without sample moment shifting is that the analog circuit before the A/D converter includes filtering due to high noises in the analog signals. For example, in comparison with $T_{rs}$ and $T_{sh}$, the dead time $T_{dt}$, though occupying only a small portion of the total time delay, may lead to processing complexity because of its current polarity dependency, and thus a single time constant $T_{MINPULSE}$ may be used which represents the sum of $T_{rs}$ and $T_{sh}$, where such a single value $T_{MINPULSE}$ may be used in certain embodiments to represent the minimum pulse width required or deemed suitable for reliable current detection.

Figure 2:
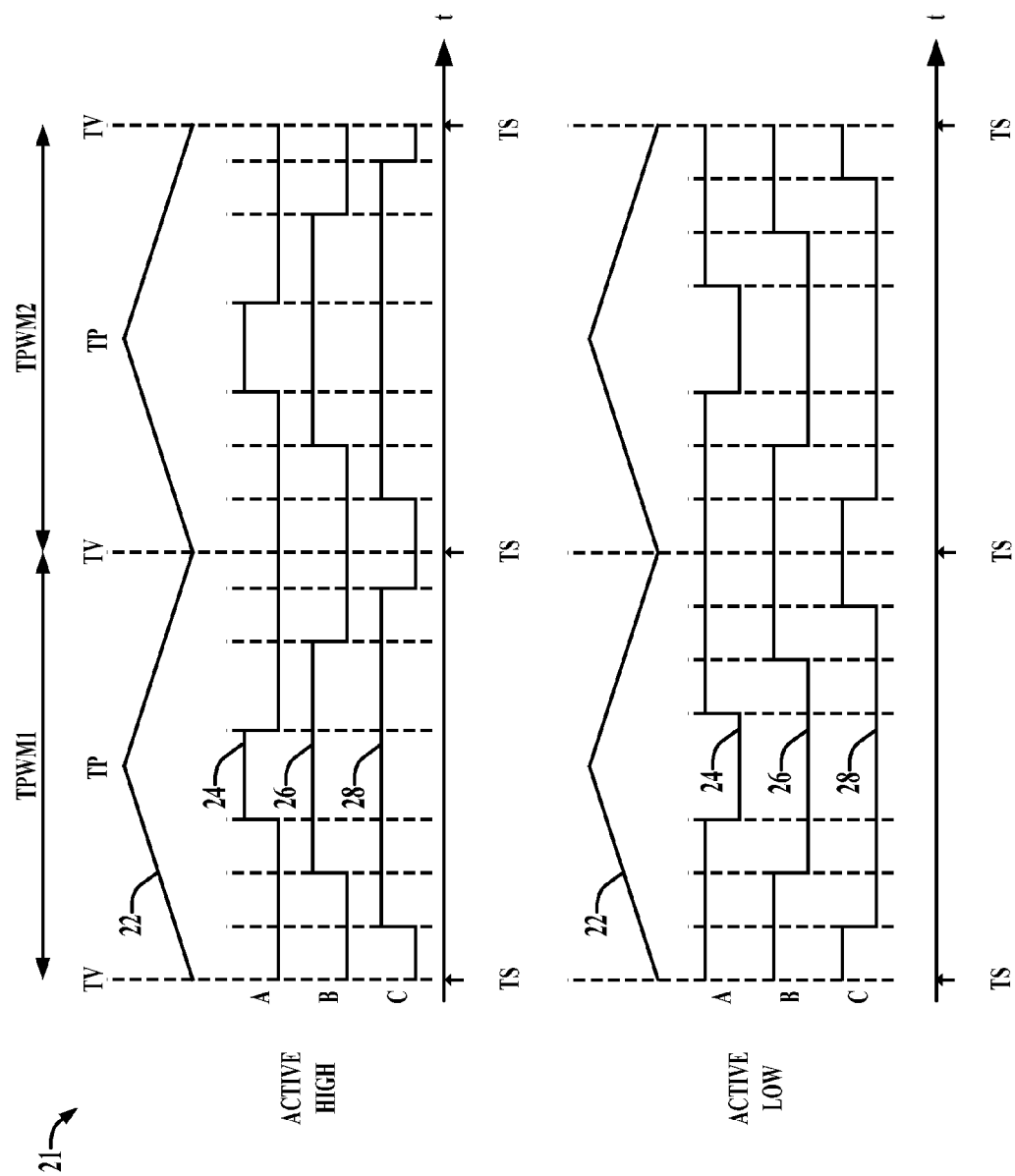
FIG. 2 is a graph.

FIG. 2 provides a graph 21 showing two representative PWM cycles TPWM1 and TPWM2 for both active high and active low control implementations, where the voltage command waveforms (not shown) for each of the inverter phases A, B and C are compared in each cycle with the carrier waveform 22, and where these signals and comparisons may be done in hardware and/or in processor-executed software or firmware in various implementations. The graph 21 in FIG. 2 illustrates waveforms 24, 26 and 28 corresponding respectively to inverter phases A, B and C. In addition, FIG. 2 denotes the peak times TP at which the carrier waveform 22 has a maximum or peak value, as well as the minimal or "valley" times TV, with a nominal sampling time or sample moment TS defaulting to shunt sensor current sampling at the valley times TV in this example. As seen in FIG. 2, moreover, each PWM cycle begins and ends with a minimal value or valley of the waveform 22. While illustrated as using a triangular waveform 22, other carrier waveforms can be used of any suitable shape having maximal or peak values and minimal or valley values in various embodiments. Moreover, other embodiments are possible in which a default sampling time TS is not strictly align with a minimum or valley point TV.

In operation of certain embodiments, the controller 10 loads a most recent compare register value at the valley of carrier waveform 22, and the active high mode embodiment may have an asymmetrical low side pulse on either side of the valley time TV, whereas active low mode presents a symmetrical pulse along the center line of the carrier peak time TP. Thus, the low side pulse width for active high mode operation is determined according to two adjacent command voltage vectors, while this is determined in active low mode by a single compare value, which simplifies the algorithm design in certain implementations. The present disclosure contemplates selective control of the amount of sampling time delay and/or pulse width adjustment to facilitate accurate inverter current measurement and reconstruction.

FIGS. 3-5 respectively illustrate a hexagonal space vector modulation diagram (30, 40, 50) and corresponding shunt signal waveforms for the inverter phases A, B and C in terms of the current system operating modulation index Mi as a function of time, with a threshold value TH1 corresponding to modulation index values below unity. In the situation of FIG. 3, the unity modulation index corresponds to voltage vector circle that inscribes the hexagonal boundary 34 of the space vector modulation diagram 30, with the low side on-times at or below the first threshold TH1 corresponding to a hexagonal boundary 36 representing a modulation index that allows accurate current sampling using all of the shuts RA, RB, and RC in consideration of the necessary or appropriate sampling time. As seen in FIG. 4, the width of the zero vector during which all three of the low side devices are turned on decreases with increasing modulation index. The space vector modulation diagram 40 in FIG. 4 illustrates over modulation when the peak of the carrier goes above 1 and shows unmeasurable regions 44 in which only one shunt current can be accurately measured during the corresponding low side device on-time, where the signal waveforms in the graph 42 transition above the threshold TH1. If the modulation index increases further, the crossing point of any two phase modulation waveforms will be higher than the threshold TH1, and the voltage vector enters into region 44. FIG. 5 also illustrates over modulation operation in which the signal waveforms in the graph 52 exceed unity and shows the maximum modulation index the system can achieve with only sampling moment shifting and no pulse width extension. The space vector modulation diagram 50 shows regions 54 in which only one shunt value may be accurately measured due to the further reduction in the low side device on-times corresponding to further increases in modulation index without extending the pulse width edge.

As seen in FIGS. 3-5, the phase with the narrowest low side pulse controls the minimum detection window if the modulation index exceeds the threshold value TH1. For a three phase load with a floating neutral point, only two phase currents need to be sampled, since all three phases are balanced allowing reconstruction of the third phase as seen in FIG. 4. Thus, using two phase currents with wider lower side voltage pulse width expands the operational modulation index range such that the intersection point of any two phase modulation waveforms at the positive side is lower than the original Mi limit TH1, thereby reducing the unmeasurable region to those regions 44 shown in the graph 40 of FIG. 4. With further increase in the modulation index as shown in FIG. 5, two phases may lose current detection capability due to sampling time limits for the system 2 even using sampling moment shifting (e.g., region 54). Since the minimum sampling time requirement is mostly before the sampling moment TS, the minimum pulse width would be doubled if the sampling moment aligns to the center of the pulse. The inventors have appreciated that reconfiguring the sampling moment reduces the pulse width requirement to only half of the above pulse, wherein the immeasurable area 54 is reduced to only one fourth of the region size 44 in FIG. 4, thereby raising the modulation index threshold TH1 as shown in the graph 50 of FIG. 5 and further expanding the usable modulation index range for controlling the inverter 6.

Figure 6:
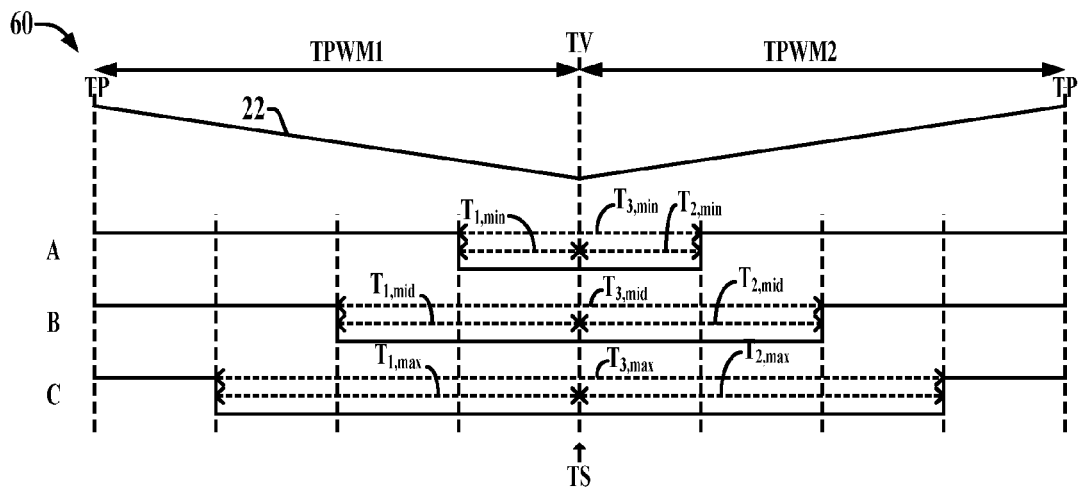
FIGS. 6-12 are graphs.
Figure 13:
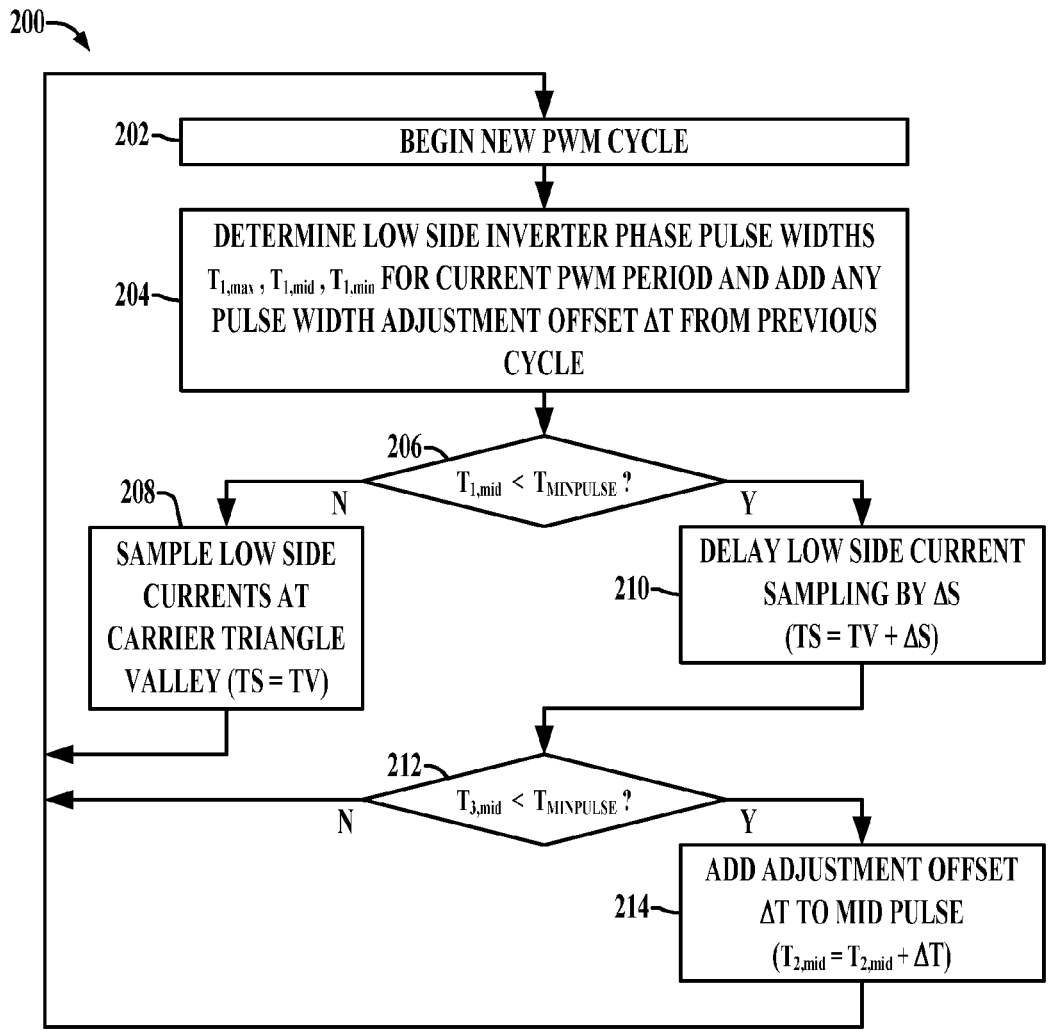
FIGS. 13 and 14 are flow diagrams.
Figure 14:
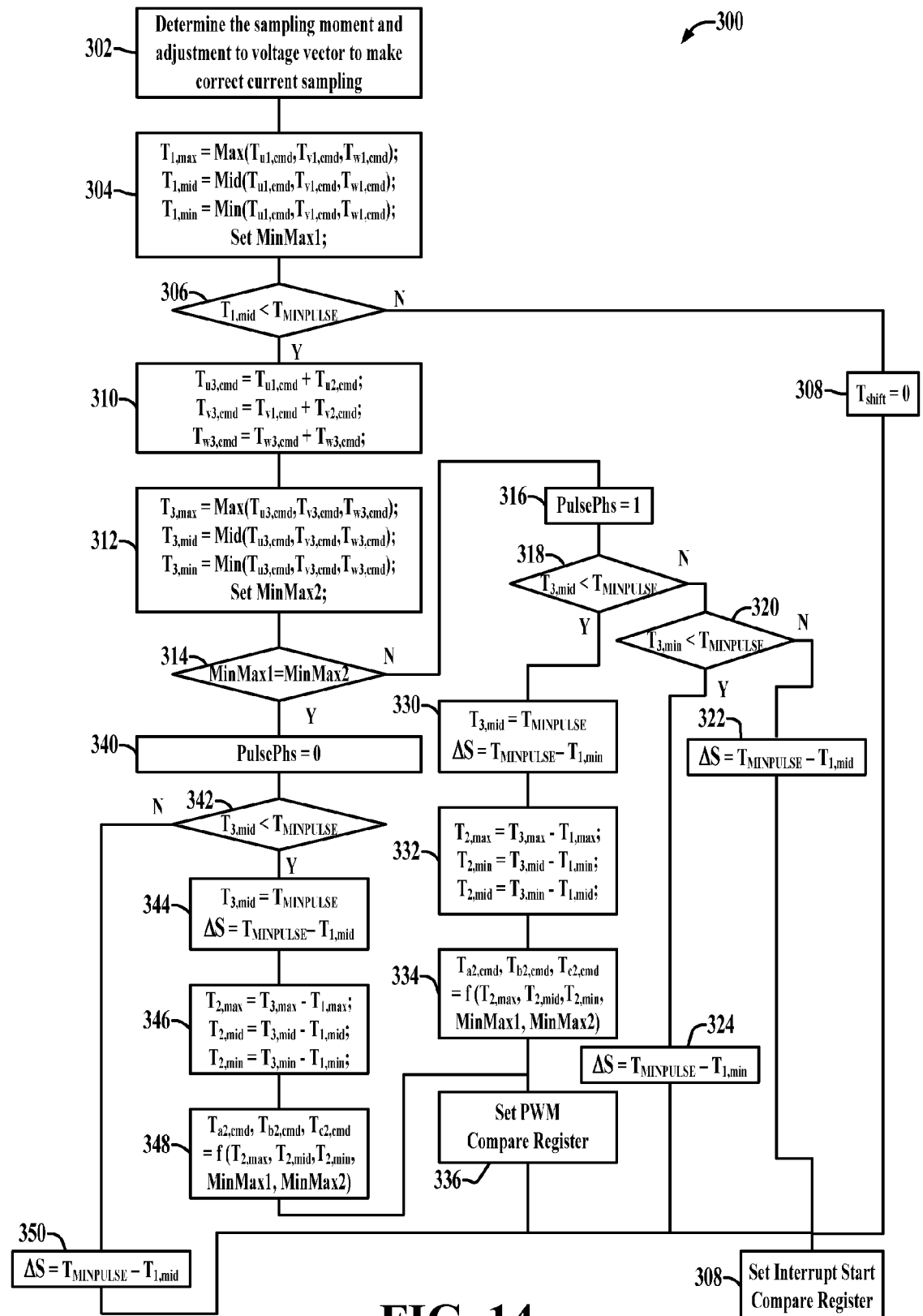

Referring now to FIGS. 6-14, FIG. 13 illustrates a simplified flow diagram or process 200 for controlled pulse width modulation and low side inverter current sampling which may be carried out in the above-described system 2 in certain embodiments, and FIGS. 6-12 provide graphs illustrating various different operational conditions in the system 2. In addition, FIG. 14 illustrates a detailed process 300 showing one particular implementation or embodiment of controller operation in a power conversion system 2. As seen in the active low graph 60 of FIG. 6, the tags $T_{x,min}$, $T_{x,mid}$, and $T_{x,max}$ (number x represents different portion of the pulse) designate the minimum, medium or middle, and maximum pulse width for different situations on the lower legs of the system 2, where the number x=1 designates the pulse width before the valley time TV, x=2 designates the pulse width after the valley time TV, and x=3 designates the total continuous pulse total on-time. Thus, the total active or continuous low side device on time $T_{3,mid}$ for the middle phase (phase B in this example) in FIG. 6 is the sum of the on-time portion $T_{1,mid}$ corresponding to the given PWM cycle TPWM1 before TV and the on-time portion $T_{2,mid}$ corresponding to the next PWM cycle TPWM2 after TV, and the same is true for the maximal and minimal pulse widths $T_{x,min}$ and $T_{x,max}$. As further seen in FIG. 1, moreover, the sampling control component 17 receives the computed pulse widths for the current PWM cycle from the PWM control component 15, and selectively provides sample delay values $\Delta S$ and pulse width delay times $\Delta T$ to the PWM control component 15 as described further hereinafter. Moreover, the processor 12 in FIG. 1 provides the computed maximum, middle and minimum pulse width times in certain embodiments to the PWM driver circuit 13 as shown in FIG. 1 for generation of the pulse width modulated control signals 16, including any adjusted pulse width on times selectively employed or implemented by the sampling control component 17.

Referring back to FIG. 13, although the exemplary methods 200 and 300 in FIGS. 13 and 14 as well as other methods of the disclosure are depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, processor-executed firmware, configurable logic or the like, or combinations thereof, in order to provide the inverter current sampling and pulse width modulation control concepts disclosed herein.

In the process 200 of FIG. 13, a new PWM cycle begins at 202, and at 204, the controller 10 determines maximal, middle and minimum low side inverter phase pulse width values $T_{1,max}$, $T_{1,mid}$, $T_{1,min}$ at 200 for operating the low side switching devices AN, BN and CN in a current PWM cycle. In one example at 204, the controller 10 determines a largest pulse width value $T_{1,max}$, as well as a middle pulse width value $T_{1,mid}$ having a lower value than the largest pulse width value $T_{t,max}$, and a lowest pulse width value $T_{1,min}$ having a lower value than the middle pulse width value $T_{t,mid}$. At 206, the controller 10 determines whether the middle pulse width value $T_{1,mid}$ for the given PWM cycle TPWM1 is less than a non-zero first threshold $T_{MINPULSE}$. If not (N at 206), the process 200 proceeds to 208 where the controller 10 samples the low side currents at the carrier triangle valley times (TS=TV) or other default sampling time, and the process 200 is repeated by returning to 202 to begin the next PWM cycle.

If $T_{1,mid}$ is less than $T_{MINPULSE}$ (Y at 206 in FIG. 13), the controller 10 selectively delays the low side current sampling of at least one inverter output phase current A, B, C at 210 in the given PWM cycle TPWM1 by a non-zero sampling delay time value $\Delta S$ from the default or nominal sample time TV corresponding to the minimum value or valley of the PWM carrier waveform 22 at or near the end of the given PWM cycle TPWM1 (TS=TV+$\Delta S$ in this embodiment). In this case, the controller 10 further determines at 212 whether the middle one $T_{3,mid}$ of a plurality of total continuous low side switching device on-time inverter phase pulse width values $T_{3,max}$, $T_{3,mid}$ and $T_{3,min}$ near the end of the given PWM cycle TPWM1 is less than a non-zero second threshold, which can be different than the first threshold at 206 or can be $T_{MINPULSE}$ as shown in the example of FIG. 13. If not (N at 212 in FIG. 13), the process 200 returns to 202 in order to begin the next PWM cycle. Otherwise (Y at 212), the controller 10 selectively extends the middle total continuous on-time $T_{3,mid}$ at 214 by adding a non-zero adjustment offset time value $\Delta T$ to a middle pulse width value $T_{2,mid}$ (e.g., by setting $T_{2,mid}=T_{2,mid}+\Delta T$ to set $T_{3,min}$ to $T_{MINPULSE}$, with $T_{2,mid}$ or $T_{2,min}$ being adjusted accordingly in one non-limiting implementation) for the next or following PWM cycle TPWM2.

Thus, the controller 10 selectively extends the pulse width when necessary at 212, 214 to facilitate accurate sampling of at least two of the low side inverter currents. As noted above, the thresholds at 206 and 212 are equal in the illustrated method 200, but can be different in other embodiments. As previously discussed, moreover, one or both of the thresholds at 206, 212 can be determined by preprogramming or in real time by the processor 12 based at least partially on a sum of a minimum time (e.g., $T_{rs}$) for current to stabilize in an inverter leg circuit after the corresponding low side switching device AN, BN or CN turns on, and a signal conditioning time delay (e.g., $T_{sh}$ described above). In certain embodiments, the controller 10 selectively determines the sampling delay time value $\Delta S$ as the first threshold $T_{MINPULSE}$ minus one of the middle pulse width value $T_{1,mid}$ and the lowest pulse width value $T_{1,min}$ for the given PWM cycle TPWM1 (e.g., $\Delta S=T_{MINPULSE}-T_{1,mid}$ at 322, 344 and 350 in FIG. 14 below, or $\Delta S=T_{MINPULSE}-T_{1,min}$ at 324 and 330 in FIG. 14). In this manner, the controller 10 advantageously adjusts or extends the pulse width only as needed to facilitate accurate current feedback, and tends to minimize the amount of selective pulse width adjustment to avoid or mitigate control or operational disruption in the inverter operation.

FIG. 14 shows a detailed process 300 for current sampling control which may be implemented in one embodiment by the controller 10 in FIG. 1. In this implementation, the PWM compare registers of the controller 10 are updated at the valley time TV of the carrier waveform 22, and the on-time of the low side inverter switching devices spans two consecutive PWM periods including the current PWM cycle TPWM1 and the next cycle TPWM2. For example, the total low side device continuous on-time $T_{3,min}$ near the end of the current PWM cycle TPWM1 for the phase having the smallest on-time (shown as phase A in the scenario of FIG. 6) includes of $T_{1,min}$ in TPWM1 and $T_{2,min}$ in TPWM2. The total continuous on-time is thus determined by two modulation indices in consecutive PWM cycles, and will often be asymmetrical about the valley time TV due to variation or changes in the modulation index during operation of the system 2. In this scenario, the measurable area on the vector plane (e.g., FIGS. 3-5 above) is not determined by one single vector, but the average of two consecutive vectors. The inventors have appreciated that if the average vector stays outside of the immeasurable area for both the current in the next PWM cycle, the low side current can be properly sampled even if one of them falls amid the immeasurable area.

The process 300 in FIG. 14 begins at 302 in order to determine the sampling moment (TS) and any voltage vector adjustment by selective extension of one or more pulse widths to facilitate proper or accurate current sampling. At 304 in FIG. 14, pulse widths $T_1$ for the current PWM cycle (TPWM1) are determined according to any suitable pulse width modulation control technique, such as closed loop control to provide motor load operation at one or more desired setpoints (e.g., $T_{1,max}=\text{MAX}(T_{a1,cmd},T_{b1,cmd},T_{c1,cmd})$, $T_{1,mid}=\text{Mid}(T_{a1,cmd},T_{b1,cmd},T_{c1,cmd})$ and $T_{1,min}=\text{Min}(T_{a1,cmd},T_{b1,cmd},T_{c1,cmd})$. As shown in FIG. 6, for example, the three phase lower leg voltage command values in the current PWM cycle TPWM1 are compared with the carrier waveform 22 and the maximum, medium and minimum values are computed, which are denoted as $T_{1,max}$, $T_{1,mid}$, $T_{1,min}$ respectively. It will be appreciated that any of the three inverter phases A, B or C can be the maximum, middle or minimum with respect to low side device on-time during a given PWM cycle. Accordingly, the controller 10 sets a flag or variable "MinMax1" at 300 for indicating the inverter phases corresponding to the maximum, middle and minimum during the present PWM cycle.

Figure 7:
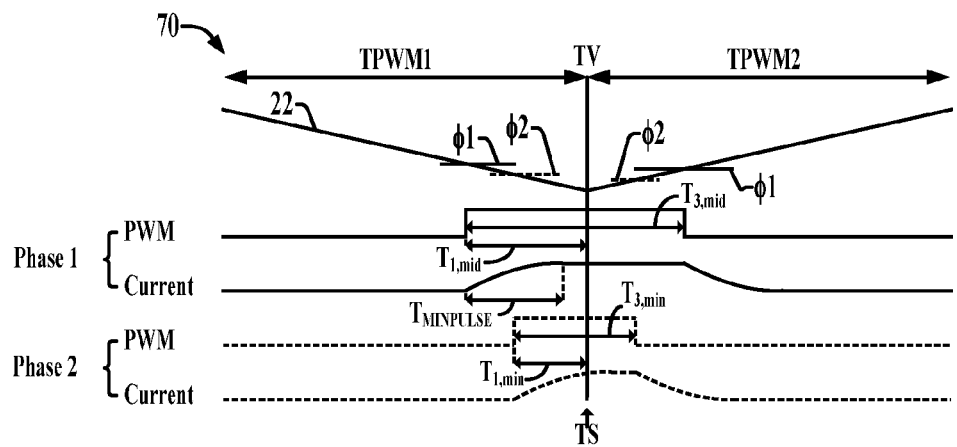

At 306 in FIG. 14, the controller 10 determines whether the computed middle pulse width $T_{1,mid}$ for the low side devices is less than a first threshold, in this case the value $T_{MINPULSE}$. If not (N at 306), the process 300 proceeds to 308 for no sampling time shifting, with the controller 10 setting a sample time shifting value $\Delta S=0$ at 308, after which an interrupt start compare register is set at 309 without any sample time shifting, and the process 300 returns to 302. The graph 70 in FIG. 7 illustrates this condition, in which the on-time portions in the current PWM cycle TPWM1 for the middle and minimum phases are each sufficiently long (e.g., greater than $T_{MINPULSE}$) for accurate sampling, and thus the sample time TS is not shifted relative to TV. As seen in FIGS. 7-12, moreover, the compare values for two phases indicated as "Phase 1" and "Phase 2" are shown as solid and dashed short lines labelled Φ1 and Φ2 respectively for the compare values of these respective inverter phases, where the PWM signal transitions occur when these compare signals or values cross the carrier waveform 22.

Figure 8:
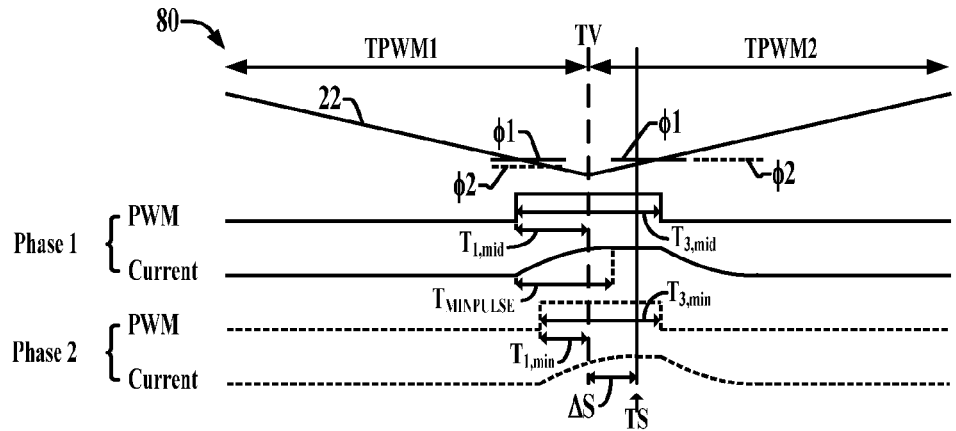
Figure 9:
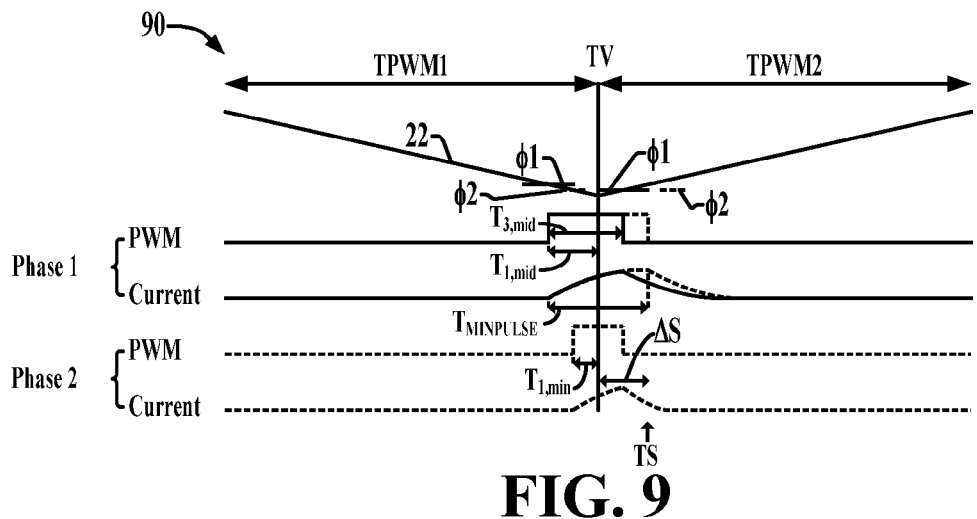

Referring also to the graph 80 in FIG. 8, if $T_{1,mid}$ is less than $T_{MINPULSE}$ (Y at 306 in FIG. 14), the controller 10 presumes that some sample time shifting to delay the sample time TS some non-zero amount ($\Delta S$ in the illustrated examples) after TV will facilitate accurate low side current sampling in the system 2. In this regard, the current is always detectable for the phase with maximum pulse width $T_{1,max}$, which always exceeds $T_{MINPULSE}$ in the described embodiments, but one or both of the remaining phases do not satisfy this condition. This situation is shown in the graphs 80, 90, 100, 110 and 120 of FIGS. 8-12, in which the middle pulse width on-time $T_{1,mid}$ at the end of the present PWM cycle TPWM1 is less than $T_{MINPULSE}$.

In certain embodiments, the controller 10 implements selective delaying of the sampling time TS, and may further implement selective pulse width extension or adjustment to facilitate proper sampling of at least two of the low side current values in a given PWM cycle, and advantageously minimizes the control disruption according to one or more criteria. For example, the controller 10 implements the sampling control component 17 (FIG. 1) in certain embodiments to shift the sampling time TS only as much as is needed to facilitate accurate current signal sampling via the corresponding shunt resistor since the sample shifting reduces the available processing time for other computational tasks in each PWM cycle. In addition, the sampling control component 17 is executed in certain embodiments in order to avoid or mitigate sampling current at one phase while another phase is switching. The controller 10 may also preferentially avoid or mitigate modifying or adjusting the pulse width, and in certain embodiments only employs pulse width extension when necessary, and by only an amount needed to ensure or facilitate satisfactory sampling of at least two of the phase currents in a given pulse width modulation cycle.

At 310 in FIG. 14, the controller 10 computes total continuous on-time command values as the sum of the on-time values for the current PWM cycle TPWM1 and the next cycle TPWM2 (e.g., $T_{a3,cmd}=T_{a1,cmd}+T_{a2,cmd}$, $T_{b3,cmd}=T_{b1,cmd}+T_{b2,cmd}$, and $T_{c3,cmd}=T_{c3,cmd}+T_{c3,cmd}$). As these low side total continuous on-times may change the designation of a particular inverter phase A, B or C as maximum, middle or minimum, the controller 10 then determines these designations at 312 in FIG. 14 (e.g., $T_{3,max}=\text{Max}(T_{a3,cmd},T_{b3,cmd},T_{c3,cmd})$, $T_{3,mid}=\text{Mid}(T_{a3,cmd},T_{b3,cmd},T_{c3,cmd})$, and $T_{3,min}=\text{Min}(T_{a3,cmd},T_{b3,cmd},T_{c3,cmd})$) and computes or sets a flag or variable "MinMax2" at 312 designating the maximum, middle and minimum inverter phases during the continuous on-time bridging the present and next PWM cycles TPWM1 and TPWM2.

A determination is made at 314 in FIG. 14 by the controller 10 as to whether the maximum, middle and minimum phase designations have changed in transitioning from the current PWM cycle TPWM1 to the next cycle TPWM2 by determining whether MaxMin1 is equal to MaxMin2. If so (Y at 314), the designated middle phase has not changed, and the selective sample shifting and on-time adjustment are relatively straightforward as described further below in connection with 340-348, for example, as shown in the graph 90 of FIG. 9.

If not (N at 314), the process 300 of FIG. 14 proceeds to 316 where the controller 10 sets a pulse phase flag PulsePhs=1, and determines whether the total continuous on-time for the middle phase $T_{3,mid}$ is less than $T_{MINPULSE}$ at 318. In this situation, $T_{1,mid}$ and $T_{3,mid}$ are associated with different inverter phases and thus the middle pulse and minimum pulse switch their roles in terms of the pulse width before TV and with respect to the total continuous pulse width. There are three different cases: (1) $T_{3,min}>T_{MINPULSE}$ and $T_{3,mid}>T_{MINPULSE}$ (N at 320 in FIG. 14), (2) $T_{3,min}<T_{MINPULSE}$ and $T_{3,mid}>T_{MINPULSE}$ (Y at 320), and (3) $T_{3,min}<T_{MINPULSE}$ and $T_{3,mid}<T_{MINPULSE}$ (Y at 318). Examples of the situations in these three cases (1), (2), and (3) are shown in the graphs 100, 110 and 120 of FIGS. 10, 11 and 12, respectively.

Figure 10:
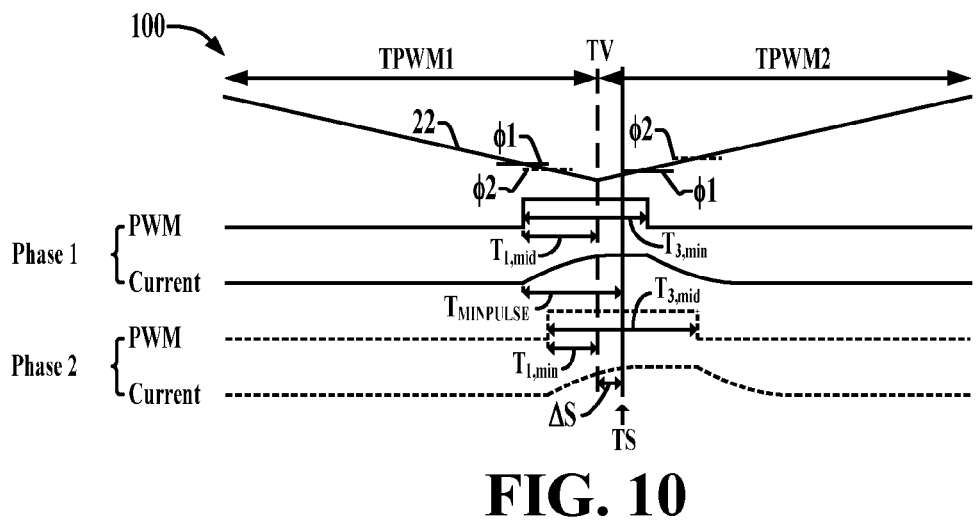
Figure 11:
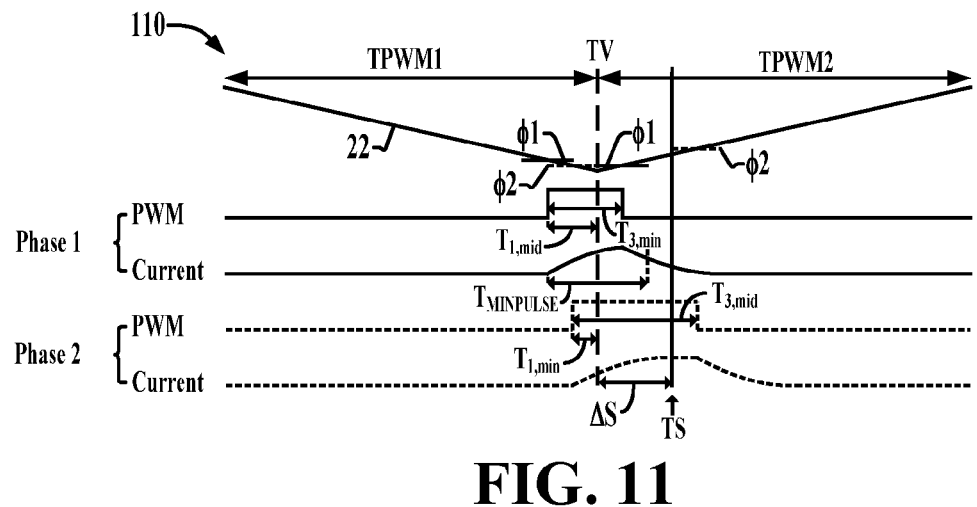
Figure 12:
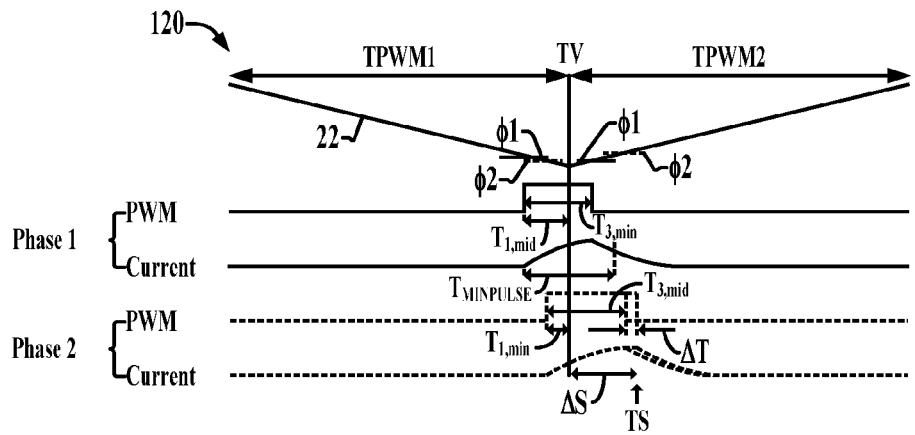

For cases (1) and (2) the controller determines at 320 whether $T_{3,min}<T_{MINPULSE}$, and if not (N at 320), the situation in FIG. 10 is identified. In this case, the minimum pulse $T_{3,min}$ and medium pulse $T_{3,mid}$ are both larger than $T_{MINPULSE}$, and current can be detected by shifting the sampling moment in reference to either one of them without requiring any pulse width extension or adjustment. The controller 10 in this case sets the shifting distance or amount $\Delta S$ at 322 in reference to $T_{3,min}$ in one embodiment as $\Delta S=T_{MINPULSE}-T_{1,mid}$, and the interrupt start compare register is set accordingly at 309 before the process 300 returns for another cycle at 302. Otherwise, for case (2) where $T_{1,mid}>T_{1,min}$ (e.g., graph 110 in FIG. 11), the delay time shift $\Delta S$ is set in reference to $T_{3,mid}$ as $\Delta S=T_{MINPULSE}-T_{1,min}$ at 324 since $T_{1,mid}>T_{1,min}$.

For case (3) with $T_{3,mid}<T_{MINPULSE}$ (Y at 318 in FIG. 14), one of the pulses is widened for sampling. If $T_{3,min}$ is adjusted, the pulse on the lower leg is extended by time $T_{MINPULSE}-T_{3,min}$, and the sampling moment is delayed by $T_{MINPULSE}-T_{1,mid}$. If instead $T_{3,mid}$ pulse is adjusted, the pulse width is extended by time $T_{MINPULSE}-T_{3,mid}$, and the sampling moment is shifted by $T_{MINPULSE}-T_{1,min}$. Thus one option is to modify the pulse width more while shifting the sampling time less, and another is to modify the pulse width less but shift the sampling moment more. Since $T_{MINPULSE}-T_{3,min}>T_{MINPULSE}-T_{3,mid}$ with respect to pulse width extension and $T_{MINPULSE}-T_{1,mid}<T_{MINPULSE}-T_{1,min}$ for sampling time shifting, the minimization of modification to the existing vector and the minimization of sampling moment shift are in opposition. In various embodiments, different options can be undertaken by the controller 10.

In the illustrated non-limiting example, the controller 10 sets the total middle continuous on-time $T_{3,mid}$ to $T_{MINPULSE}$ at 330 and sets the sampling delay $\Delta S = T_{MINPULSE} - T_{1,min}$. In this case, the minimization of voltage vector adjustment is prioritized because it can adversely affect the total THD of output current, and hence the controller mitigates the amount of pulse width modification. At 332, the controller 10 sets the pulse widths for the next PWM period accordingly, with $T_{2,max} = T_{3,max} - T_{1,max}$, $T_{2,min} = T_{3,mid} - T_{1,min}$, and $T_{2,mid} = T_{3,min} - T_{1,mid}$, where the middle phase pulse width is adjusted based on $T_{1,mid}$ and the overall minimum pulse duration $T_{3,min}$. At 334, the controller 10 sets the command values as a function of the selectively adjusted next period pulse widths according to MinMax1 and MinMax2 in this case indicating that MinMax1 and MinMax2 are unequal, the PWM compare register is set at 336 for generating the PWM switching control signals 16 accordingly (FIG. 1) and the compare interrupt start register is set at 309 ($\Delta S = T_{MINPULSE} - T_{1,min}$) to complete the current PWM cycle.

Returning to 314 in FIG. 14, where $T_{1,mid}$ and $T_{3,mid}$ are associated with the same phase (e.g., MinMax1=MinMax2, Y at 314), the current is sampled directly from the middle phase, and the controller 10 accordingly sets the PulsePhs flag to 0 at 340. At 342, the controller 10 determines whether $T_{3,mid}$ is less than $T_{MINPULSE}$. If not (N at 342), the total pulse width is larger than the minimum sampling pulse requirement $T_{MINPULSE}$, and the sampling time TS is shifted by $\Delta S = T_{MINPULSE} - T_{1,mid}$ at 350. The interrupt start compare register is accordingly set at 309 and the process 300 returns for the next PWM cycle at 302. Otherwise (Y at 342), the medium pulse will be extended to accommodate accurate current sampling, with the controller 10 setting $T_{3,mid} = T_{MINPULSE}$ for pulse width extension and setting $\Delta S = T_{MINPULSE} - T_{1,mid}$ at 344 for sampling delay. At 346, the controller 10 sets the pulse widths for the next PWM period with $T_{2,max} = T_{3,max} - T_{1,max}$ (same as in 332 above), $T_{2,mid} = T_{3,mid} - T_{1,mid}$ (different than 332), and $T_{2,min} = T_{3,min} - T_{1,min}$ (different than 332). At 348, the controller 10 sets the command values as a function of the selectively adjusted next period pulse widths according to MinMax1 and MinMax2, the PWM compare register is set at 336 for generating the PWM switching control signals 16 accordingly (FIG. 1), the compare interrupt start register is set at 309 ($\Delta S = T_{MINPULSE} - T_{1,min}$), and the process 300 returns to 302 for the next PWM cycle.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method, comprising:
   in a given pulse width modulation (PWM) cycle, determining low side inverter phase pulse width values for operating low side switching devices of a switching inverter, including determining a largest pulse width value, determining a middle pulse width value having a lower value than the largest pulse width value, and determining a lowest pulse width value having a lower value than the middle pulse width value; and
   if the middle pulse width value for the given PWM cycle is less than a non-zero first threshold, selectively delaying low side current sampling of at least one inverter output phase current in the given PWM cycle by a non-zero sampling delay time value from a nominal sample time corresponding to a minimum value or valley of a PWM carrier waveform near an end of the given PWM cycle.

2. The method of claim 1, comprising:
   if a middle one of a plurality of total continuous low side switching device on-time inverter phase pulse width values near the end of the given PWM cycle is less than a non-zero second threshold, selectively extending the middle total continuous on-time by adding a non-zero adjustment offset time value to a middle pulse width value for a next PWM cycle.

3. The method of claim 2, wherein the first and second thresholds are equal.

4. The method of claim 3, wherein the first and second thresholds are based at least partially on a sum of a minimum time for current to stabilize in an inverter leg circuit after the low side switching device turns on, and a signal conditioning time delay.

5. The method of claim 2, wherein the first threshold is based at least partially on a sum of a minimum time for current to stabilize in an inverter leg circuit after the low side switching device turns on, and a signal conditioning time delay.

6. The method of claim 2, comprising selectively determining the sampling delay time value as the first threshold minus one of the middle pulse width value and the lowest pulse width value for the given PWM cycle.

7. The method of claim 6, wherein the first threshold is based at least partially on a sum of a minimum time for current to stabilize in an inverter leg circuit after the low side switching device turns on, and a signal conditioning time delay.

8. The method of claim 1, wherein the first threshold is based at least partially on a sum of a minimum time for current to stabilize in an inverter leg circuit after the low side switching device turns on, and a signal conditioning time delay.

9. The method of claim 8, comprising selectively determining the sampling delay time value as the first threshold minus one of the middle pulse width value and the lowest pulse width value for the given PWM cycle.

10. The method of claim 1, comprising selectively determining the sampling delay time value as the first threshold minus one of the middle pulse width value and the lowest pulse width value for the given PWM cycle.

11. A non-transitory computer readable medium with computer-executable instructions for:
- in a given pulse width modulation (PWM) cycle, determining low side inverter phase pulse width values for operating low side switching devices of a switching inverter, including determining a largest pulse width value, determining a middle pulse width value having a lower value than the largest pulse width value, and determining a lowest pulse width value having a lower value than the middle pulse width value; and
- if the middle pulse width value for the given PWM cycle is less than a non-zero first threshold, selectively delaying low side current sampling of at least one inverter output phase current in the given PWM cycle by a non-zero sampling delay time value from a nominal sample time corresponding to a minimum value or valley of a PWM carrier waveform near an end of the given PWM cycle.

12. The non-transitory computer readable medium of claim 11, comprising computer-executable instructions for:
- if a middle one of a plurality of total continuous low side switching device on-time inverter phase pulse width values near the end of the given PWM cycle is less than a non-zero second threshold, selectively extending the middle total continuous on-time by adding a non-zero adjustment offset time value to a middle pulse width value for a next PWM cycle.

13. A power conversion system, comprising:
- a switching inverter comprising a plurality of inverter leg circuits individually comprising at least one upper switching device coupled between a first DC input and a corresponding AC output, a lower switching device coupled with the corresponding AC output, and a current shunt coupled between the lower switching device and a second DC input;
- a controller providing pulse width modulated switching control signals to the upper and lower switching devices of the inverter leg circuits in each of a plurality of inverter pulse width modulation (PWM) cycles to convert DC power into multiphase AC output power to drive an associated load, the controller operative to:
  - determine low side inverter phase pulse width values for operating low side switching devices in a given PWM cycle, including a largest pulse width value, a middle pulse width value having a lower value than the largest pulse width value, and a lowest pulse width value having a lower value than the middle pulse width value, and
  - selectively delay low side current sampling of at least one inverter output phase current in the given PWM cycle by a non-zero sampling delay time value from a nominal sample time corresponding to a minimum value or valley of a PWM carrier waveform near an end of the given PWM cycle if the middle pulse width value for the given PWM cycle is less than a non-zero first threshold.

14. The system of claim 13, wherein the controller is operative, if a middle one of a plurality of total continuous low side switching device on-time inverter phase pulse width values near the end of the given PWM cycle is less than a non-zero second threshold, to selectively extend the middle total continuous on-time by adding a non-zero adjustment offset time value to a middle pulse width value for a next PWM cycle.

15. The system of claim 14, wherein the first and second thresholds are based at least partially on a sum of a minimum time for current to stabilize in a given inverter leg circuit after the corresponding low side switching device turns on, and a signal conditioning time delay.

16. The system of claim 14, wherein the controller is operative to selectively determine the sampling delay time value as the first threshold minus one of the middle pulse width value and the lowest pulse width value for the given PWM cycle.

17. The system of claim 16, wherein the first threshold is based at least partially on a sum of a minimum time for current to stabilize in a given inverter leg circuit after the low side switching device turns on, and a signal conditioning time delay.

18. The system of claim 13, wherein the first threshold is based at least partially on a sum of a minimum time for current to stabilize in a given inverter leg circuit after the corresponding low side switching device turns on, and a signal conditioning time delay.

19. The system of claim 18, wherein the controller is operative to selectively determine the sampling delay time value as the first threshold minus one of the middle pulse width value and the lowest pulse width value for the given PWM cycle.

20. The system of claim 13, wherein the controller is operative to selectively determine the sampling delay time value as the first threshold minus one of the middle pulse width value and the lowest pulse width value for the given PWM cycle.

* * * * *